United States Patent
Tanaka et al.

(10) Patent No.: US 12,461,609 B2
(45) Date of Patent: Nov. 4, 2025

(54) ELECTRONIC PEN

(71) Applicant: Wacom Co., Ltd., Saitama (JP)

(72) Inventors: Kohei Tanaka, Saitama (JP); Takenori Kaneda, Saitama (JP); Yuta Sato, Saitama (JP); Kyohei Ono, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 18/608,167

(22) Filed: Mar. 18, 2024

(65) Prior Publication Data

US 2024/0302909 A1    Sep. 12, 2024

Related U.S. Application Data

(63) Continuation of application No. PCT/JP2022/032171, filed on Aug. 26, 2022.

(30) Foreign Application Priority Data

Sep. 22, 2021  (JP) ................. 2021-154607

(51) Int. Cl.
  *G06F 3/0354*  (2013.01)
  *G06F 3/038*   (2013.01)
  *G06F 3/044*   (2006.01)

(52) U.S. Cl.
  CPC ........ *G06F 3/03545* (2013.01); *G06F 3/0383* (2013.01); *G06F 3/0442* (2019.05); *G06F 2203/04105* (2013.01)

(58) Field of Classification Search
  CPC .. G06F 3/03545; G06F 3/0442; G06F 3/0383; G06F 2203/04105
  See application file for complete search history.

(56) References Cited

U.S. PATENT DOCUMENTS 9,239,639 B1 * 1/2016 Vanderet ............. G06F 3/03545
9,269,488 B2 * 2/2016 Obata ................ G06F 3/03545
9,430,061 B2 * 8/2016 Eruchimovitch ...... B43K 29/08
(Continued)

FOREIGN PATENT DOCUMENTS

CN   111538425 A  *  8/2020  ......... G06F 3/03545
WO   WO 2019225120 A1   11/2019

OTHER PUBLICATIONS

English Translation of International Search Report dated Nov. 15, 2022, for the corresponding International Patent Application No. PCT/JP2022/032171, 2 pages.

*Primary Examiner* — Ke Xiao
*Assistant Examiner* — Jennifer L Zubajlo
(74) *Attorney, Agent, or Firm* — Seed Intellectual Property Law Group LLP

(57) ABSTRACT

Provided is an electronic pen including a core body, a pressure detector which, in operation, detects a pressure applied to the core body, and a transmitting component which is located between the core body and the pressure detector and which, in operation, transmits the pressure applied to the core body to the pressure detector, in which the transmitting component includes two separate components including a core body holding component which holds the core body and a pressing component which, in operation, presses the pressure detector, and a rear end surface of the core body holding component and a front end surface of the pressing component are opposed to each other.

6 Claims, 5 Drawing Sheets

(56) References Cited

U.S. PATENT DOCUMENTS

| | | | |
|---|---|---|---|
| 10,061,406 B2* | 8/2018 | Arai | G06F 3/0383 |
| 10,216,292 B2* | 2/2019 | Munakata | G06F 3/03545 |
| 10,345,930 B2* | 7/2019 | Horie | G06F 3/0383 |
| 10,379,640 B2* | 8/2019 | Eguchi | G06F 3/0441 |
| 2012/0146960 A1* | 6/2012 | Shih | G06F 3/03545 |
| | | | 345/179 |
| 2012/0256830 A1* | 10/2012 | Oda | G06F 3/046 |
| | | | 345/157 |
| 2015/0116289 A1* | 4/2015 | Stern | G06F 3/03545 |
| | | | 345/179 |
| 2016/0018912 A1* | 1/2016 | Kaneda | G06F 3/03545 |
| | | | 345/179 |
| 2017/0322643 A1* | 11/2017 | Eguchi | G06F 3/04162 |
| 2018/0129316 A1* | 5/2018 | Kremin | G06F 3/0383 |
| 2018/0348898 A1* | 12/2018 | Kato | B32B 27/30 |
| 2023/0077162 A1* | 3/2023 | Sakamoto | G06F 3/0383 |
| 2024/0152220 A1* | 5/2024 | Kaneda | G06F 3/03545 |

* cited by examiner (PRIOR ART)

ELECTRONIC PEN

BACKGROUND

1. Technical Field

The present disclosure relates to an electronic pen that functions as a position indicator for a position detecting device mounted in an electronic device such as, for example, a pen tablet device or a tablet personal computer (PC).

2. Description of the Related Art

Position detecting devices are mounted in electronic devices such as pen tablet devices and tablet PCs, which are input devices for personal computers. A position detecting device largely includes a position detecting sensor and a position detecting circuit. The position detecting sensor receives a position indication signal from an electronic pen and the position detecting circuit detects the position indicated by the electronic pen on the position detecting sensor based on an output signal from the position detecting sensor that corresponds to the position indication signal. In order to appropriately determine the state (writing state) in which the electronic pen is contacting an operation surface of the position detecting sensor and performing an input operation, the electronic pen includes a pressure detector (writing pressure detector) that detects a pressure (writing pressure) applied to a pen tip of the electronic pen. The electronic pen includes the result of the detection by the pressure detector in a position indication signal and transmits the position indication signal to the position detecting device. Accordingly, when the electronic pen is contacting the operation surface of the position detecting sensor and performing writing, the indication made by the electronic pen can be detected appropriately based on the position indication signal transmitted from the electronic pen. In this way, the electronic pen can input the indication.

Various improvements have been made to electronic pens. For example, PCT Patent Publication No. WO 2019/225120 (hereinafter referred to as Patent Document 1) discloses a technique relating to an electronic pen that enables a delicate information input into a position detecting device as if a delicate information input is performed on paper with a pencil. The electronic pen disclosed in Patent Document 1 transmits a writing pressure applied to a core body (1) to a writing pressure detector (3), so that the writing pressure can be detected. The result of the detection by the writing pressure detector (3) is supplied to an electronic circuit in which the result of the detection is included in a signal supplied from a transmitting circuit. The signal is then output and transmitted to the position detecting device. The core body (1) is disposed so as to penetrate through a central axis of a coil spring (2). When no writing pressure is applied to the core body (1), the core body (1) is not biased by the coil spring (2), and a tip part (21) of the coil spring (2) on a pen tip side is connected to the core body (1), and a tip part of the coil spring (2) on the side opposite to the pen tip side is connected to the electronic circuit mounted on a circuit board (5).

Accordingly, the core body (1) is held in the electronic pen without imposing a large load in an axial direction of the electronic pen, and even when a small writing pressure is applied to the core body (1), the writing pressure can be appropriately transmitted to the writing pressure detector (3). Therefore, the electronic pen disclosed in Patent Document 1 can transmit even a small amount of writing pressure to the writing pressure detector, so that a delicate information input can be performed on the position detecting device, as if thin strokes are drawn on paper with a pencil.

As illustrated in FIG. 3 of Patent Document 1, in the electronic pen disclosed in Patent Document 1, a pen tip part (11) and a shaft part (13) are connected through a conductive elastic component (12) and therefore the one continuous core body (1) having conductivity as a whole is configured. A pressing component (31) is attached to a rear end side of the core body (1). A few contacting parts are disposed around the core body (1) to which the pressing component (31) is attached so as to allow the core body (1) to slide without a stress in the axial direction (longitudinal direction) of the electronic pen. Therefore, when a pressure in a direction intersecting the axial direction is applied to the pen tip part (11), there is a possibility that the core body (1) tilts. When the core body (1) of the electronic pen contacts the operation surface and performs a drawing input, a pressure (writing pressure) is applied not only in the axial direction but also in the direction intersecting the axial direction.

FIGS. 6A and 6B are views illustrating the state in which the pressing component (31) is pressing a first electrode (32) of the writing pressure detector (3) when a pressure is applied to the core body (1) of the electronic pen disclosed in Patent Document 1. When a pressure in the axial direction is applied straight to the pen tip part (11), the pressing component (31) can appropriately press a central portion of the first electrode (32), as illustrated in FIG. 6A. By contrast, when a pressure in the direction intersecting the axial direction is also applied to the pen tip part (11), the core body (1) tilts and the pressing component (31) is displaced in the direction opposite to the direction in which the force is applied. In this case, as illustrated in FIG. 6B, the pressing component (31) contacts the first electrode (32) at an angle to the first electrode (32) when pressing the first electrode (32), so that there is a possibility that the pressing force cannot be appropriately applied to the first electrode (32).

Therefore, it is conceivable to provide a wall around the core body (1) to regulate the position. However, this may complicate the manufacturing process or prevent the core body (1) from being appropriately pushed in or prevent the pushed-in core body (1) from being appropriately pushed back due to the contact between the wall and the core body (1). If the core body (1) cannot be appropriately pushed in, drawing cannot be performed appropriately. Further, if the core body (1) cannot be appropriately pushed back, the writing pressure applied to the core body (1) is maintained even though no writing pressure is applied to the core body (1). This results in a generally-called ink leakage condition of the electronic pen, in which unnecessary drawing input is performed. In the description above, the numbers in brackets indicate the reference signs in Patent Document 1.

BRIEF SUMMARY

In view of the foregoing, it is desirable to provide a high-precision electronic pen which can perform a delicate information input at all times.

There is provided an electronic pen including: a core body, a pressure detector which, in operation, detects a pressure applied to the core body, and a transmitting component which is located between the core body and the pressure detector and which, in operation, transmits the pressure applied to the core body to the pressure detector, in which the transmitting component includes two separate components including a core body holding component which holds the core body and a pressing component which, in operation, presses the pressure detector, and a rear end surface of the core body holding component and a front end surface of the pressing component are opposed to each other.

In the electronic pen according to one or more embodiments of the present disclosure, the transmitting component which, in operation, transmits a pressure applied to the core body to the pressure detector is disposed between the core body and the pressure detector. The transmitting component includes the core body holding component which holds the core body and the pressing component which, in operation, presses the pressure detector. The core body holding component and the pressing component are separated from each other. The rear end surface of the core body holding component and the front end surface of the pressing component are opposed to each other. With this configuration, even when a force in a direction intersecting an axial direction is applied to the core body, the pressing component does not tilt in the direction intersecting the axial direction and a pressure applied in the axial direction can be appropriately transmitted to the pressure detector since the core body holding component and the pressing component are separated from each other.

DETAILED DESCRIPTION

An electronic pen according to an embodiment of the present disclosure will be described below with reference to the drawings. The following embodiment takes as an example the case where the present disclosure is applied to an electronic pen of an active capacitive system that indicates a position on a position detecting sensor by transmitting a position indication signal formed by a transmitting circuit mounted in the electronic pen to the position detecting sensor via a core body. In the embodiment described below, the circuit that forms the position indication signal will be referred to as a "transmitting circuit." This is because there are cases where not only a signal generated by an oscillator is used as it is as the position indication signal but also a signal generated by the oscillator is subjected to various modulations and formed into a desired position indication signal and then the position indication signal is transmitted. For this reason, the term "transmitting" which means transmitting information widely is used herein.

Example of Configuration of Electronic Pen 1

Figure 1:
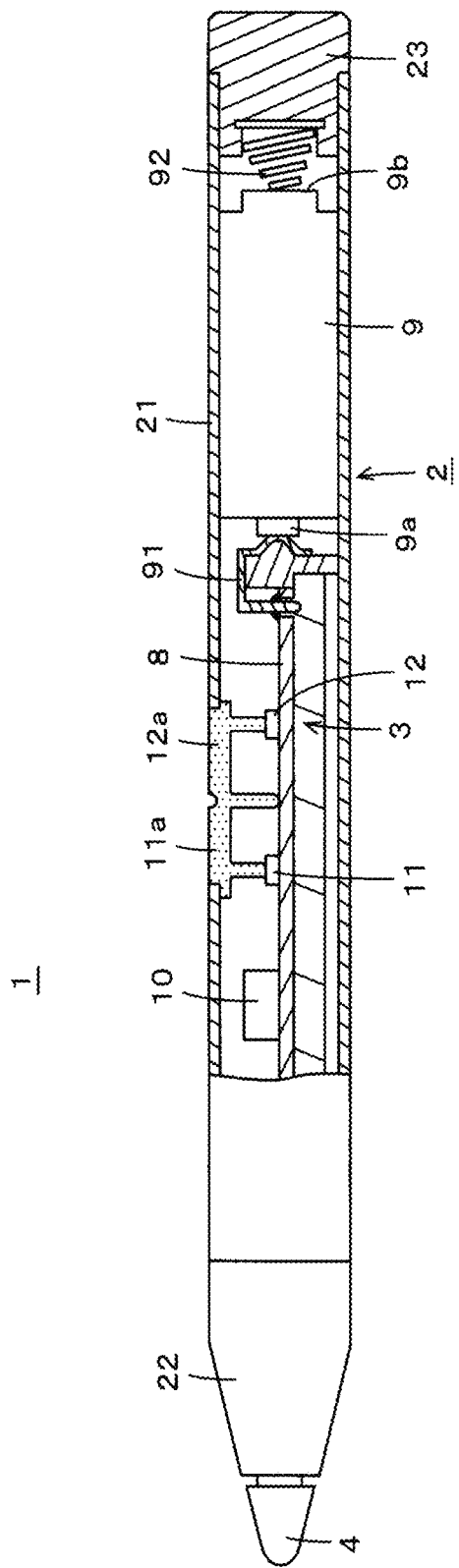
FIG. 1 is a view for describing an example of a configuration of an electronic pen according to an embodiment of the present disclosure.
Figure 2:
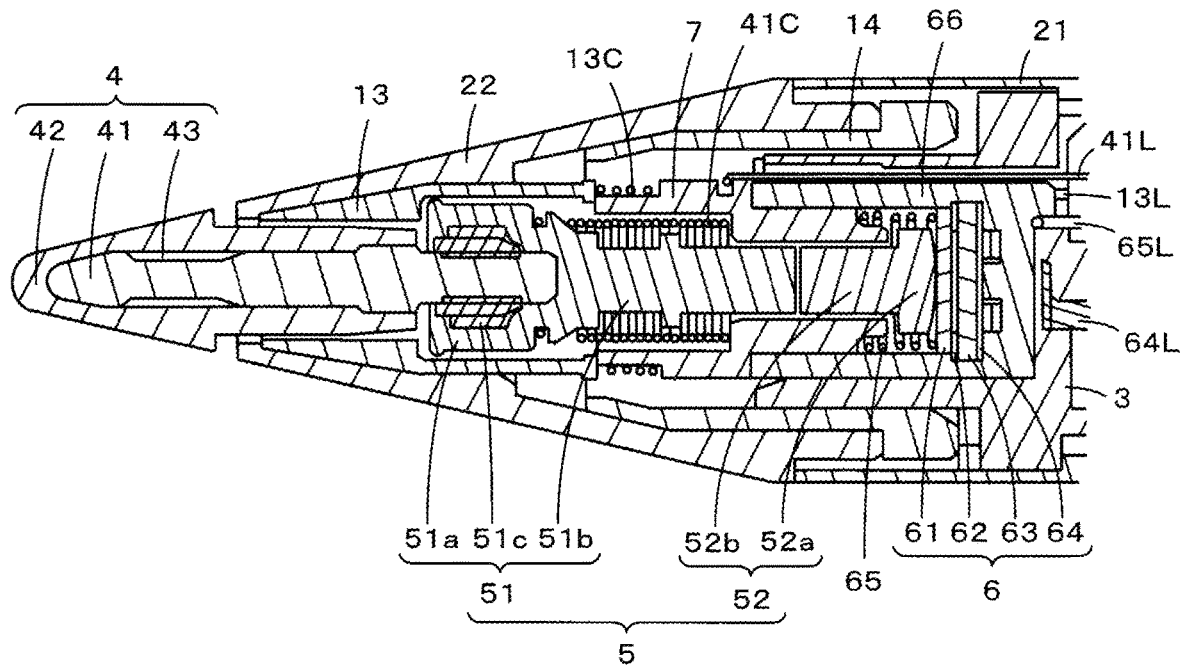
FIG. 2 is a view for describing a portion of the electronic pen according to the embodiment on a pen tip side.

FIG. 1 is a view for describing an example of a configuration of an electronic pen 1 according to the present embodiment. In FIG. 1, a case (casing) 2 of the electronic pen 1 is cut partially to illustrate the inside thereof. FIG. 2 is a view (enlarged sectional view) for describing a portion of the electronic pen 1 on a pen tip side thereof.

As illustrated in FIG. 1, the electronic pen 1 is elongated in an axial direction (the direction along an axis of the electronic pen 1) and includes the case (casing) 2 having a cylindrical shape. One end of the electronic pen 1 in the axial direction serves as the pen tip side and has an opening, and the other end of the electronic pen 1 in the axial direction is closed. The case 2 includes a cylindrical case main body 21, which has a hollow portion inside, a front cap 22, and a rear cap 23. The front cap 22 and the rear cap 23 are coupled to the case main body 21. The case 2 is formed by fitting the front cap 22 and the rear cap 23 to the case main body 21.

In the hollow portion of the case 2, as illustrated in FIG. 1, a board holder 3, which holds mounted components such as a printed circuit board 8, and a battery 9 are housed, and components for realizing functions as the electronic pen 1 are housed on the pen tip side. The case main body 21 and the rear cap 23 are formed of a conductive material. In the present embodiment, the case main body 21 and the rear cap 23 are formed of, for example, alumite-processed aluminum. The front cap 22 is formed of a non-conductive material. In the present embodiment, the front cap 22 is formed of, for example, plastic.

As illustrated in FIG. 1, a terminal conductor 91 is disposed at an end of the board holder 3 on a side opposite to the pen tip side of the board holder 3. The terminal conductor 91 electrically abuts against a positive-side terminal 9a of the battery 9 and is electrically connected to a copper foil pattern of a power supply line of the printed circuit board 8. A coil spring terminal 92, which is formed of a conductive metal and is electrically connected to a negative-side terminal 9b of the battery 9, is disposed in a fitting portion of the rear cap 23 fitted to the case main body 21. As illustrated in FIG. 1, the battery 9 is inserted into the case 2 such that the positive-side terminal 9a is connected to the terminal conductor 91. After that, the rear cap 23 is fitted into the case main body 21 so as to press the negative-side terminal 9b of the battery 9 by the coil spring terminal 92.

In the present embodiment, the case main body 21, which is formed of a conductive material, is electrically connected to an earth conductor of the printed circuit board 8 via, for example, a ground electrode (ground ring) 14 to be described later, which is disposed on the front cap 22 side. Since the rear cap 23 and the case main body 21 are formed of a conductive material, the negative-side terminal 9b of the battery 9 is electrically connected to the earth conductor of the printed circuit board 8 via the rear cap 23 and the case main body 21. The positive-side terminal 9a of the battery 9 is connected to the copper foil pattern of the power supply line of the printed circuit board 8 via the terminal conductor 91. Accordingly, a voltage of the battery 9 is supplied as a power supply voltage of the circuits formed on the printed circuit board 8.

Circuit portions including a transmitting circuit (signal generating circuit) 8s, a detecting circuit 8d, a demodulating circuit 8r, a switch circuit SW, which are not illustrated in FIG. 1, a control integrated circuit (IC) 10 illustrated in FIG. 1, and other peripheral circuit components are disposed on the printed circuit board 8. The transmitting circuit 8s generates a signal to be transmitted from an electronic pen core body 4 of the electronic pen 1 and a signal to be transmitted from a transmitting/receiving electrode 13 to be described later. The transmitting circuit 8s can supply signals of different frequencies to the core body 4 and the transmitting/receiving electrode 13. The detecting circuit 8d detects the capacitance of a pressure detector 6 to be described later, in order to detect a writing pressure. The demodulating circuit 8r demodulates a signal received through the transmitting/receiving electrode 13 and supplies the demodulated information to the control IC 10.

As described later, the switch circuit SW switches whether to supply a signal from the transmitting circuit 8s to the transmitting/receiving electrode 13 or supply a signal received through the transmitting/receiving electrode 13 to the demodulating circuit 8r, under the control from the control IC 10. The control IC 10 also constitutes a control circuit that controls each of the circuit portions such as the transmitting circuit 8s and the switch circuit SW. A peripheral circuit portion includes push switches (side switches) 11 and 12, which are pressed by a user via operation parts 11a and 11b disposed on a side surface of the case main body 21, as illustrated in FIG. 1.

Although not illustrated in FIG. 1, a conductive line connecting the core body 4 to the transmitting circuit 8s and a conductive line connecting the transmitting/receiving electrode 13 to the switch circuit SW are connected to the printed circuit board 8. The transmitting/receiving electrode 13 is connected to the transmitting circuit 8s and the demodulating circuit 8r via the switch circuit SW. Although not illustrated in FIG. 1, a conductive line connecting each of first and second electrodes of the pressure detector (writing pressure detector) 6, which is configured as a variable capacitor to be described in detail later, to the capacitance detecting circuit 8d is also connected to the printed circuit board 8.

As illustrated in FIG. 2, the front cap 22 is formed in a tubular shape having a through-hole through which the electronic pen core body 4 penetrates in the axial direction. A portion of the front cap 22 on the pen tip side of the electronic pen 1 tapers such that the outer diameter becomes smaller toward the pen tip of the electronic pen 1. An end of the front cap 22 on the pen tip side thereof has an opening of the through-hole through which the electronic pen core body 4 penetrates. As described above, the portion for realizing the electronic pen functions is mounted on the front cap 22 side.

As illustrated in FIG. 2, the core body 4, a transmitting component 5, and the pressure detector 6 are disposed in series on the front cap 22 side of the case 2 in the axial direction with the same central axis. As illustrated in FIG. 2, the electronic pen core body 4 includes a core rod 41, which is formed of a conductive material, and a protective component 42, which is formed of a non-conductive material. The electronic pen core body 4 also has a space (air layer) 43 between the core rod 41 and the protective component 42. With this configuration, a signal (electric field) radiating from a tip portion and a wide portion of the egg-shaped pen tip of the core rod 41 radiates comparatively efficiently only through the protective component 42.

However, a signal (electric field) radiating from a thin portion of the core rod 41 on the rear end side with respect to the egg-shaped pen tip of the core rod 41 is deterred by the action of the space 43 and the protective component 42. This is because the space 43 and the protective component 42 have different permittivities and function like a double capacitor. Accordingly, even when the electronic pen 1 is tilted, a good position indication signal can be transmitted from the core rod 41 without becoming broader than necessary. In the following description, the electronic pen core body 4 will be simply referred to as the core body 4.

The transmitting component 5 includes two separate components including a core body holding component 51, which is located on the pen tip side, and a pressing component 52. In the present embodiment, the core body holding component 51 and the pressing component 52 are formed of, for example, a hard resin that is a non-conductive material. The core body holding component 51 has a cup-shaped holding portion 51a, which has a recess, and an extending portion 51b, which extends from a rear end of the holding portion 51a in a direction opposite to the pen tip. A conductive ring-shaped elastic component 51c, which is, for example, a conductive rubber, is fixed to an inner side surface of the recess of the holding portion 51a. The elastic component 51c slightly protrudes (overhangs) from the inner side surface of the recess of the holding portion 51a.

As illustrated in FIG. 2, when a rear end of the core body 4 is inserted into the recess of the holding portion 51a of the core body holding component 51, the elastic component 51c tightens the circumference of the rear end of the core body 4, so that the core body 4 can be attached to the core body holding component 51. Further, when the pen tip of the core body 4 attached to the core body holding component 51 is picked up and pulled out with the pen tip hooked on a fingernail of the user, for example, the core body 4 can be detached from the core body holding component 51. In this way, since the ring-shaped elastic component 51c is attached to the inner side surface of the recess of the holding portion 51a of the core body holding component 51, the core body 4 can be attached to and detached from the core body holding component 51.

As illustrated in FIG. 2, a coil spring 41C for the core body 4 is disposed around the extending portion 51b of the core body holding component 51. In other words, the extending portion 51b of the core body holding component 51 penetrates through a central axis of the coil spring 41C for the core body 4. In this case, one turn (one winding) of the coil spring 41C for the core body 4 on the holding portion 51a side fits into a recess formed on a side surface between the holding portion 51a and the extending portion 51b of the core body holding component 51, so that the coil spring 41C for the core body 4 holds the core body holding component 51. Meanwhile, it is ensured that the core body holding component 51 is not biased by the coil spring 41C for the core body 4. In other words, the core body holding component 51 is held inside the case 2 with the core body holding component 51 hanging on the coil spring 41C for the core body 4.

Furthermore, an end of the coil spring 41C for the core body 4 on the pen tip side is connected to the conductive elastic component 51c, which is disposed on the holding portion 51a of the core body holding component 51, and the other end of the coil spring 41C for the core body 4 is connected to the transmitting circuit 8s on the printed circuit board 8. As illustrated in FIG. 2, the other end of the coil spring 41C for the core body 4 is constituted by an end of an extending line (conductive line) 41L of the coil spring 41C for the core body 4. The extending line (conductive line) 41L extends from the coil spring 41C for the core body 4. Accordingly, a position indication signal from the transmitting circuit 8s on the printed circuit board 8 is supplied to the core rod 41 of the core body 4 through the coil spring 41C for the core body 4 and the elastic component 51c and then transmitted from the core rod 41 of the core body 4 to the position detecting sensor.

The pressing component 52 is located at the rear stage of the core body holding component 51. The pressing component 52 is formed in a mushroom shape and has a pressing head portion 52a and a stem-shaped portion 52b. The pressing head portion 52a is located on the pressure detector 6 side and has a wide diameter. The stem-shaped portion 52b extends from an end surface of the pressing head portion 52a on the pen tip side toward the pen tip and has a diameter smaller than that of the pressing head portion 52a. A surface (rear end surface) of the pressing head portion 52a opposite to the pen tip side is curved such that the center of the surface serves as the apex. As illustrated in FIG. 2, when no writing pressure is applied to the core body 4, the core body 4, the core body holding component 51, and the pressing component 52 are located in series in the axial direction with the same axis. When a writing pressure is applied to the core body 4 and the core body 4 is pushed toward the rear end of the electronic pen 1, the core body holding component 51 and the pressing component 52 are pushed toward the rear end of the electronic pen 1 and the pressing component 52 presses the pressure detector 6.

The pressure detector 6 is a variable capacitor formed such that a first electrode 61, which is a circular flat plate, is opposed to a surface of a dielectric 63, which is a circular flat plate, via a ring-shaped spacer 62 and a second electrode 64, which is formed of a metal, is attached to the other surface of the dielectric 63. The first electrode 61 is formed of a conductive elastic material such as, for example, conductive rubber. When a writing pressure is applied to the core body 4, which is attached to the core body holding component 51, the first electrode 61 of the pressure detector 6 is pressed by the pressing component 52 pushed in by the core body holding component 51 and approaches the dielectric 63. When the writing pressure applied to the core body 4 is released, the first electrode 61 acts to push the transmitting component 5 and the core body 4 back and return the transmitting component 5 and the core body 4 to their original positions.

In this way, the pressure (writing pressure) applied to the core body 4 can be detected in real time according to the capacitance between the first electrode 61 and the second electrode 64 that changes as the first electrode 61 approaches or leaves the dielectric 63. The first electrode 61 of the pressure detector 6 contacts a coil spring 65 for the pressure detector 6. The coil spring 65 for the pressure detector 6 is formed of a conductive material such as a metal. In this case, an extending line (conductive line) 65L, which extends from the coil spring 65 for the pressure detector 6, and an extending line (conductive line) 64L, which extends from the second electrode 64, are connected to the capacitance detecting circuit 8d on the printed circuit board 8. Accordingly, the pressure (writing pressure) applied to the core body 4 can be detected based on the capacitance between the first and second electrodes 61 and 64 of the pressure detector 6.

The portion for realizing the electronic pen functions disposed on the front cap 22 side is housed in an inner space formed by connecting the transmitting/receiving electrode 13, a pipe-shaped holding component 7, and a cup-shaped pressure detector holding component 66 to each other. In other words, as illustrated in FIG. 2, the transmitting component 5, the pressure detector 6, the coil spring 41C for the core body 4, and the coil spring 65 for the pressure detector 6 described above are housed inside the inner space formed by the transmitting/receiving electrode 13, the pipe-shaped holding component 7, and the cup-shaped pressure detector holding component 66.

The transmitting/receiving electrode 13 is formed in a pipe shape from a conductive material such as, for example, a metal and tapers toward the pen tip. A tip surface of the transmitting/receiving electrode 13 on the pen tip side abuts against an inner tip surface of the front cap 22, as illustrated in FIG. 2, and an outer side surface of the transmitting/receiving electrode 13 in a certain range from the pen tip side of the transmitting/receiving electrode 13 toward the rear end side thereof is in contact with an inner wall surface of the front cap 22. Accordingly, the transmitting/receiving electrode 13 does not rattle in a direction intersecting the axial direction. Further, a portion of the transmitting/receiving electrode 13 on the pen tip side opposed to the core body 4 has a small inner diameter with a large thickness, while a portion of the transmitting/receiving electrode 13 on the rear end side opposed to the holding portion 51a of the transmitting component 5 has a large inner diameter with a small thickness.

The pipe-shaped holding component 7, which is formed of, for example, a hard resin, is disposed at the rear stage of the transmitting/receiving electrode 13. A tip surface of the pipe-shaped holding component 7 abuts against a rear end surface of the transmitting/receiving electrode 13, as illustrated in FIG. 2. Further, an inner diameter of a portion of the pipe-shaped holding component 7 opposed to the coil spring 41C for the core body 4 wound around the core body holding component 51 is large, while an inner diameter of a portion of the pipe-shaped holding component 7 opposed to a rear end portion of the extending portion 51b of the core body holding component 51 is small. An inner diameter of a portion of the pipe-shaped holding component 7 opposed to the stem-shaped portion 52b of the pressing component 52 is even smaller than the inner diameter of the portion of the pipe-shaped holding component 7 opposed to the rear end portion of the extending portion 51b of the core body holding component 51. Accordingly, the pipe-shaped holding component 7 has an outer shape that is thicker on the pen tip side and thinner on the rear end side, as illustrated in FIG. 2.

The pressing head portion 52a of the pressing component 52 protrudes from a rear end opening of the pipe-shaped holding component 7. A diameter of the pressing head portion 52a of the pressing component 52 is larger than a diameter of the rear end opening of the pipe-shaped holding component 7, so that the pressing head portion 52a is not positioned inside the pipe-shaped holding component 7. As illustrated in FIG. 2, the coil spring 65 for the pressure detector 6 described above, which is formed of a conductive material, is sandwiched between the pipe-shaped holding component 7 and the first electrode 61 of the pressure detector 6. The extending line (conductive line) 65L of the coil spring 65 for the pressure detector 6 is connected to the capacitance detecting circuit 8d on the printed circuit board 8 as the extending line from the first electrode 61 as described above. The extending line 64L from the second electrode 64 of the pressure detector 6 is also connected to the capacitance detecting circuit 8d on the printed circuit board 8.

As illustrated in FIG. 2, the cup-shaped pressure detector holding component 66, which is formed of a hard resin, is covered from the pressure detector 6 side so as to fit to the thin rear end portion of the pipe-shaped holding component 7. In other words, an outer diameter of the thin rear end portion of the pipe-shaped holding component 7 is slightly smaller than an inner diameter of the recess of the pressure detector holding component 66, so that the cup-shaped pressure detector holding component 66 fits to the rear end portion of the pipe-shaped holding component 7. When the pressure detector holding component 66 is fitted and pushed to the rear end side of the pipe-shaped holding component 7, a tip surface of the pressure detector holding component 66 abuts against a rear end surface of the thick portion of the pipe-shaped holding component 7.

In this state, the pressure detector 6 is fixed to an inner bottom surface of the pressure detector holding component 66. At the same time, the coil spring 65 for the pressure detector 6, which is sandwiched between the pipe-shaped holding component 7 and the pressure detector 6, moderately presses the first electrode 61 against the dielectric 63 side via the ring-shaped spacer 62, so that the first electrode 61 is held in the appropriate position. In this state, the apex of the pressing head portion 52a of the pressing component 52 is slightly in contact with the first electrode 61. Therefore, in response to a pressure applied to the core body 4, the pressing component 52 immediately presses the first electrode 61 of the pressure detector 6, enabling pressure (writing pressure) detection. Note that the pressure detector holding component 66 is pressed from the rear end side by the board holder 3 and fixed in place so as not to move.

Moreover, as illustrated in FIG. 2, a coil spring 13C for the transmitting/receiving electrode 13 is disposed on a side surface of the pipe-shaped holding component 7 on the pen tip side. One end of the coil spring 13C is connected to the transmitting/receiving electrode 13. The other end of the coil spring 13C is constituted by an end of an extending line (conductive line) 13L, which extends from the coil spring 13C in FIG. 2, and connected to the transmitting circuit 8s on the printed circuit board 8. A ground electrode 14, which is formed of a conductive material such as, for example, a metal, is disposed outside the pipe-shaped holding component 7 and the pressure detector holding component 66. The ground electrode 14 connects the case main body 21 and the earth conductor of the printed circuit board 8 to each other, as described above.

In this way, the transmitting/receiving electrode 13, the pipe-shaped holding component 7, and the pressure detector holding component 66 are fixedly disposed between the inner tip surface of the front cap 22 and the board holder 3 with the transmitting/receiving electrode 13, the pipe-shaped holding component 7, and the pressure detector holding component 66 being connected to each other on the front cap 22 side. In the inner space formed by connecting the transmitting/receiving electrode 13, the pipe-shaped holding component 7, and the pressure detector holding component 66 to each other, the transmitting component 5 and the pressure detector 6 are disposed and the core body 4 is detachably attached to the core body holding component 51, as described above with reference to FIG. 2.

In this case, as illustrated in FIG. 2, a relatively generous space (clearance) is provided around the core body holding component 51 to which the core body 4 is attached. With this configuration, the core body holding component 51 can be slid, that is, pushed in or pushed back in the axial direction without receiving a stress, in response to a pressure (writing pressure) applied to or released from the core body 4. However, during writing, the pen tip of the core body 4 of the electronic pen 1 is pressed against an operation surface and operated so as to move in various directions. Therefore, in many cases, a force in the direction intersecting the axial direction is applied to the pen tip of the core body 4.

As illustrated in FIG. 2, the relatively generous space (clearance) is provided around the core body holding component 51, so that the rear end side of the core body holding component 51 may be displaced in the direction intersecting the axial direction in response to a force applied to the core body 4 in the direction intersecting the axial direction. However, as described with reference to FIG. 2, the pressing component 52 is a separate component from the core body holding component 51, so that the pressing component 52 is not affected by the pressure applied in the direction intersecting the axial direction.

As illustrated in FIG. 2, the stem-shaped portion 52b of the pressing component 52 is held such that the stem-shaped portion 52b of the pressing component 52 is inserted into the rear end side of the pipe-shaped holding component 7. The pressing component 52 is held in an appropriate position so as to have a small space between an inner wall surface of the pipe-shaped holding component 7 and the stem-shaped portion 52b of the pressing component 52. Further, since the core body holding component 51 and the pressing component 52 are separate components, the pressing component 52 is not affected even if the rear end of the core body holding component 51 is displaced diagonally. Therefore, even if the space between the inner wall surface of the pipe-shaped holding component 7 and the stem-shaped portion 52b of the pressing component 52 is small, the pressing component 52 can appropriately transmit a pressure applied to the core body 4 in the axial direction to the pressure detector 6 without receiving a stress.

Figure 3:
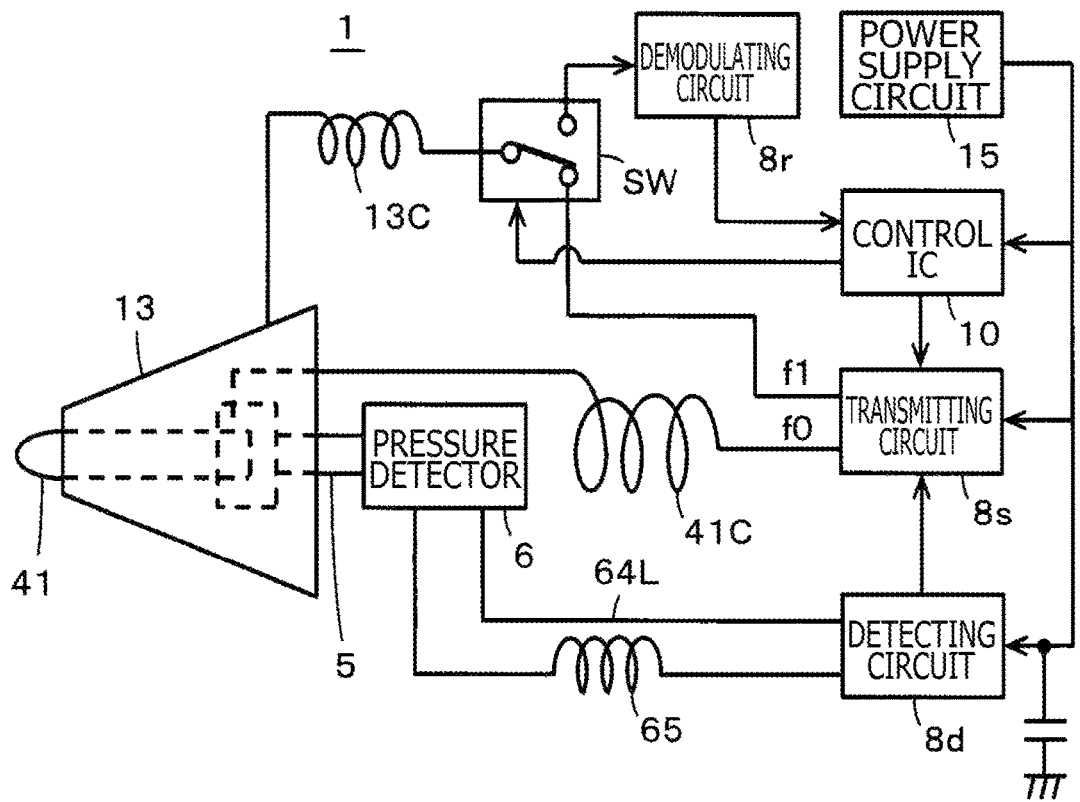
FIG. 3 is a diagram for describing an equivalent circuit of the electronic pen according to the embodiment of the present disclosure.

FIG. 3 is a diagram illustrating an equivalent circuit of the electronic pen 1 according to the present embodiment described with reference to FIGS. 1 and 2. As illustrated in FIG. 3, the core rod 41 of the core body 4 is connected to the transmitting circuit 8s via the coil spring 41C for the core body 4 and can transmit a position indication signal with a frequency of f0, for example. The transmitting/receiving electrode 13 is connected to the switch circuit SW via the coil spring 13C and connected via the switch circuit SW to the transmitting circuit 8s and the demodulating circuit 8r. The switch circuit SW is switched under the control from the control IC 10.

Therefore, when the switch circuit SW is switched to the transmitting circuit 8s side, the transmitting/receiving electrode 13 can transmit a tilt detection signal with, for example, a frequency of f1, from the transmitting circuit 8s. When the switch circuit SW is switched to the demodulating circuit 8r side, a signal received from a position detecting device via the transmitting/receiving electrode 13 can be supplied to the demodulating circuit 8r. Accordingly, a request for transmission of identification information can be received from a position detecting circuit via the transmitting/receiving electrode 13 and demodulated by the demodulating circuit 8r. The demodulation result can be notified to the control IC 10. In this case, the control IC 10 can control the transmitting circuit 8s to transmit a position indication signal including an identification ID of its own electronic pen to the position detecting device. In this way, the transmitting/receiving electrode 13 can transmit the tilt detection signal and receive the identification signal from the position detecting circuit.

The first electrode 61 of the pressure detector 6, which is pressed by the transmitting component 5 in response to a writing pressure applied to the core body 4, is connected to the capacitance detecting circuit 8d via the coil spring 65 for the pressure detector 6, and the second electrode 64 of the pressure detector 6 is connected to the capacitance detecting circuit 8d via the extending line 64L of the second electrode 64. Accordingly, the detecting circuit 8d can detect the pressure (writing pressure) applied to the core body 4 in response to a change in the capacitance.

A pressure (writing pressure) applied to the core body 4 and detected by the detecting circuit 8d is included in a position indication signal by the transmitting circuit 8s, so that the position indication signal can be transmitted from the core body 4 to the position detecting sensor. The transmitting circuit 8s is controlled by the control IC 10. A power supply circuit 15 supplies a drive power to each circuit portion. In the electronic pen 1 according to the present embodiment, each of the coil spring 41C for the core body 4, the coil spring 13C, and the coil spring 65 for the pressure detector 6 does not function as an inductor element.

Specifically, the coil spring 41C for the core body 4 realizes a function of holding the core body holding component 51 inside the case 2 in a highly freely movable state without biasing and a function of supplying the position indication signal from the transmitting circuit 8s to the core rod 41 of the core body 4. Further, the coil spring 13C also realizes a function of supplying the tilt detection signal from the transmitting circuit 8s to the transmitting/receiving electrode 13 without affecting the surroundings and without strain. The coil spring 13C also realizes a function of supplying a signal received via the transmitting/receiving electrode 13 to the demodulating circuit 8r without affecting the surroundings and without strain. The coil spring 65 for the pressure detector 6 realizes functions of biasing the first electrode 61 of the pressure detector 6 toward the dielectric 63 with an appropriate force to appropriately position the first electrode 61 and connecting the first electrode 61 to the capacitance detecting circuit 8d.

Variations of Transmitting Component 5

As described above, the transmitting component 5 of the electronic pen 1 according to the present embodiment includes two separate components, that is, the core body holding component 51 and the pressing component 52. Therefore, even when a pressure in the direction intersecting the axial direction is applied to the pen tip of the core body 4 attached to the core body holding component 51, the core body holding component 51 can contain the effect without affecting the pressing component 52. Accordingly, a pressure applied to the core body 4 in the axial direction can be appropriately transmitted to the pressure detector 6 via the pressing component 52.

Moreover, the relatively generous space is provided around the core body holding component 51 to which the core body 4 is attached. With this configuration, the core body holding component 51 can be freely slid, that is, pushed in or pushed back in the axial direction without coming into contact with a surrounding wall surface (without receiving a stress), in response to a pressure (writing pressure) applied to or released from the core body 4. Therefore, the pressure applied to the core body 4 in the axial direction can be appropriately transmitted to the pressure detector 6 via the pressing component 52.

Moreover, it is possible to more appropriately transmit a pressure applied to the core body 4 in the axial direction to the pressure detector 6 by devising the shape of a contact portion between the core body holding component 51 and the pressing component 52 constituting the transmitting component 5. Hereinafter, variations of the shape of the contact portion between the core body holding component 51 and the pressing component 52 will be described in detail. FIGS. 4A to 5D are views for describing variations of the core body holding component 51 and the pressing component 52 of the electronic pen 1 according to the present embodiment.

Example in which Flat Surface is Opposed to Flat Surface

Figure 4A:
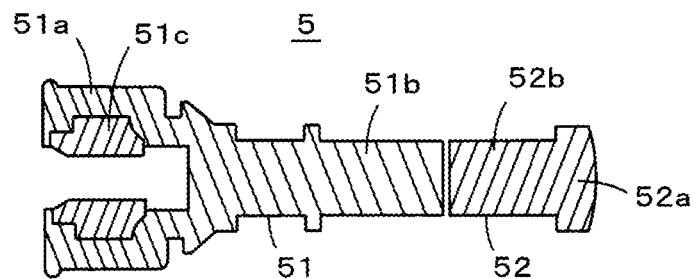
FIGS. 4A to 4D are views for describing variations of a core body holding component and a pressing component of the electronic pen according to the embodiment of the present disclosure.

FIG. 4A is a view illustrating only the transmitting component 5 extracted from the portion of the electronic pen 1 on the pen tip side illustrated in FIG. 2. As described above, the transmitting component 5 includes the core body holding component 51 and the pressing component 52, which are separate components. As described above, the core body holding component 51 includes the cup-shaped holding portion 51a and the extending portion 51b with the ring-shaped elastic component 51c disposed inside the recess of the holding portion 51a. As also described above, the pressing component 52 includes the pressing head portion 52a and the stem-shaped portion 52b.

As illustrated in FIG. 2 and FIG. 4A, a rear end surface of the extending portion 51b of the core body holding component 51 is opposed to a front end surface of the stem-shaped portion 52b of the pressing component 52. In the case of the transmitting component 5 illustrated in FIGS. 2 and 4A, the rear end surface of the extending portion 51b of the core body holding component 51 and the front end surface of the stem-shaped portion 52b of the pressing component 52 are both flat surfaces. In this way, the core body holding component 51 and the pressing component 52 are separate components. With this configuration, even when a pressure in the direction intersecting the axial direction is applied to the core body 4 attached to the core body holding component 51, the core body holding component 51 can transmit, without having this effect directly on the pressing component 52, a pressure applied to the core body 4 in the axial direction to the pressing component 52.

There are cases where the core body holding component 51 may be slightly tilted due to the clearance around the core body holding component 51 when a pressure in the direction intersecting the axial direction is applied to the core body 4 attached to the core body holding component 51. The rear end surface of the extending portion 51b of the core body holding component 51 and the front end surface of the stem-shaped portion 52b of the pressing component 52 are both flat surfaces. Accordingly, there are cases where the angle and position where the rear end surface of the extending portion 51b of the core body holding component 51 contacts the front end surface of the stem-shaped portion 52b of the pressing component 52 change, disabling the center of the rear end surface of the extending portion 51b to press the center of the front end surface of the stem-shaped portion 52b. In this case, a pressure applied to the core body 4 in the axial direction may not be appropriately transmitted to the pressure detector 6 via the pressing component 52.

Therefore, consideration is given to minimizing, as much as possible, the effect of a pressure in the direction intersecting the axial direction applied to the core body 4 attached to the core body holding component 51 and the resulting slight tilt of the core body holding component 51. In the variations of the transmitting component 5 illustrated in FIGS. 4B, 4C, 4D, and 5A to 5D, components configured in a similar way to the transmitting component 5 illustrated in FIGS. 2 and 4A will be denoted with the same reference signs and the detailed description thereof will be omitted to avoid redundancy.

Example in which Flat Surface is Opposed to Curved Surface

Figure 4B:
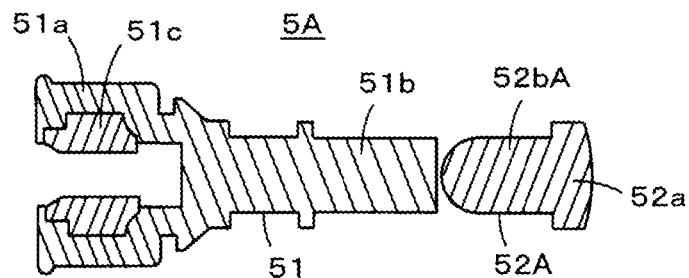

A transmitting component 5A illustrated in FIG. 4B includes the core body holding component 51 and a pressing component 52A. A front end surface of a stem-shaped portion 52bA of the pressing component 52A is a curved (dome-shaped) surface having the apex at the center, as illustrated in FIG. 4B. Accordingly, the rear end surface of the extending portion 51*b* of the core body holding component 51, which is a flat surface, is opposed to the front end surface of the stem-shaped portion 52*b*A of the pressing component 52A, which is a curved surface having the apex at the center. In this case, assume that the core body holding component 51 is slightly tilted when a pressure in the direction intersecting the axial direction is applied to the core body 4 attached to the core body holding component 51.

Figure 6A:
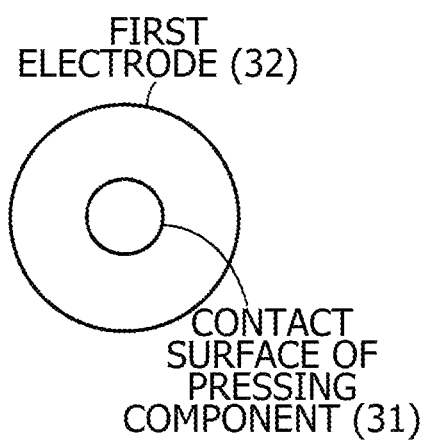
FIGS. 6A and 6B are views each illustrating a state in which a pressing component is pressing a writing pressure detector when a writing pressure is applied to a core body of a conventional electronic pen.
Figure 6B:
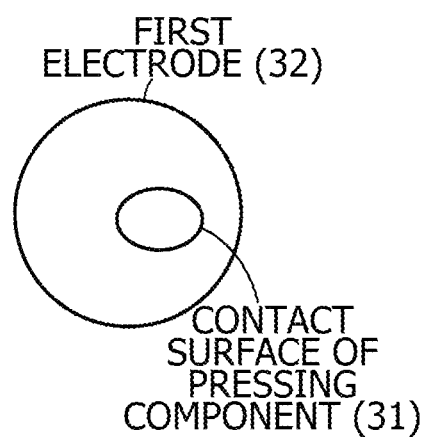

Even in this case, since the front end surface of the stem-shaped portion 52*b*A of the pressing component 52A is a curved surface, the center of the rear end surface of the extending portion 51*b* can contact the apex portion of the front end surface of the stem-shaped portion 52*b*A. Therefore, the position where the core body holding component 51 contacts the pressing component 52A does not change significantly, preventing the occurrence of the state described with reference to FIG. 6B. Accordingly, the core body holding component 51 can appropriately transmit the pressure applied to the core body 4 in the axial direction to the pressing component 52A and the pressing component 52A can press the pressure detector 6, so that the pressure (writing pressure) applied to the core body 4 can be appropriately detected.

Example in which Curved Surface is Opposed to Flat Surface

Figure 4C:
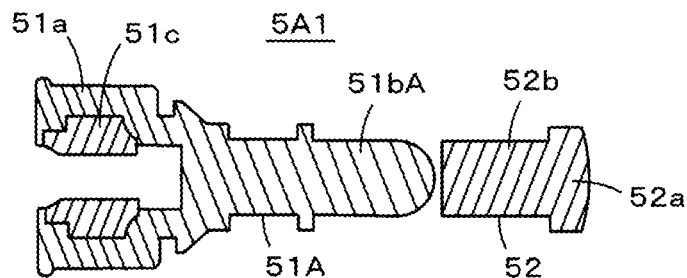

A transmitting component 5A1 illustrated in FIG. 4C includes a core body holding component 51A and the pressing component 52. A rear end surface of an extending portion 51*b*A of the core body holding component 51A is a curved (dome-shaped) surface having the apex at the center, as illustrated in FIG. 4C. Accordingly, the rear end surface of the extending portion 51*b*A of the core body holding component 51A, which is a curved surface having the apex at the center, is opposed to the front end surface of the stem-shaped portion 52*b* of the pressing component 52, which is a flat surface. In other words, the shapes of the rear end surface of the extending portion 51*b*A and the front end surface of the stem-shaped portion 52*b* are opposite to those illustrated in FIG. 4B. In this case, assume that the core body holding component 51A is slightly tilted when a pressure in the direction intersecting the axial direction is applied to the core body 4 attached to the core body holding component 51A.

The rear end surface of the extending portion 51*b*A of the core body holding component 51A is a curved surface. Therefore, the apex portion of the rear end surface of the extending portion 51*b*A can contact the central portion of the front end surface of the stem-shaped portion 52*b*. Therefore, in this case as well, the position where the core body holding component 51A contacts the pressing component 52 does not change significantly, preventing the occurrence of the state described with reference to FIG. 6B. Accordingly, the core body holding component 51A can appropriately transmit the pressure applied to the core body 4 in the axial direction to the pressing component 52 and the pressing component 52 can press the pressure detector 6, so that the pressure (writing pressure) applied to the core body 4 can be appropriately detected.

Example in which Curved Surface is Opposed to Curved Surface

Figure 4D:
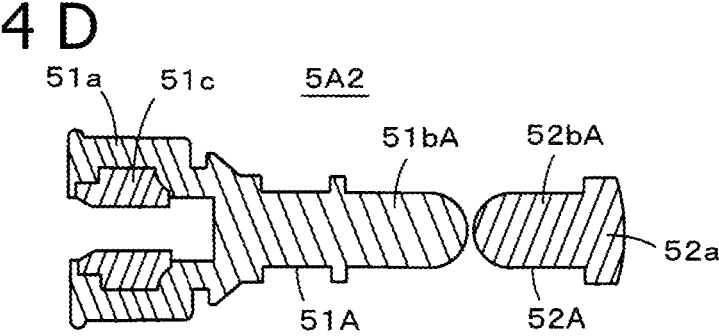

A transmitting component 5A2 illustrated in FIG. 4D is a combination of the core body holding component 51A illustrated in FIG. 4C and the pressing component 52A illustrated in FIG. 4B. Accordingly, the rear end surface of the extending portion 51*b*A of the core body holding component 51A is a curved (dome-shaped) surface having the apex at the center, as illustrated in FIGS. 4C and 4D. The front end surface of the stem-shaped portion 52*b*A of the pressing component 52A is a curved (dome-shaped) surface having the apex at the center, as illustrated in FIGS. 4B and 4D. In this case, assume that the core body holding component 51A is slightly tilted when a pressure in the direction intersecting the axial direction is applied to the core body 4 attached to the core body holding component 51A.

The rear end surface of the extending portion 51*b*A and the front end surface of the stem-shaped portion 52*b*A are both curved surfaces having the apex at the center. Accordingly, the apex portion of the rear end surface of the extending portion 51*b*A can contact the apex portion of the front end surface of the stem-shaped portion 52*b*A. Therefore, in this case as well, the position where the core body holding component 51A contacts the pressing component 52A does not change significantly, preventing the occurrence of the state described with reference to FIG. 6B. Accordingly, the core body holding component 51A can appropriately transmit the pressure applied to the core body 4 in the axial direction to the pressing component 52A and the pressing component 52A can press the pressure detector 6, so that the pressure (writing pressure) applied to the core body 4 can be appropriately detected.

Figure 5A:
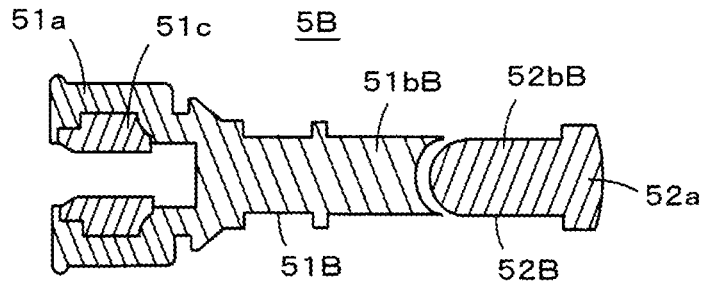
FIGS. 5A to 5D are views for describing variations of the core body holding component and the pressing component of the electronic pen according to the embodiment of the present disclosure.

Example in which Recessed Curved Surface is Opposed to Protruding Curved Surface A transmitting component 5B illustrated in FIG. 5A includes a core body holding component 51B and a pressing component 52B. A rear end surface of an extending portion 51*b*B of the core body holding component 51B is a recessed curved (cup-shaped) surface having the apex at the center, as illustrated in FIG. 5A. A front end surface of a stem-shaped portion 52*b*B of the pressing component 52B is a protruding curved (dome-shaped) surface having the apex at the center. Accordingly, the rear end surface of the extending portion 51*b*B of the core body holding component 51B, which is a recessed curved surface having the apex at the center, is opposed to the front end surface of the stem-shaped portion 52*b*B of the pressing component 52B, which is a protruding curved surface having the apex at the center. Accordingly, the front end surface of the stem-shaped portion 52*b*B, which is the protruding curved surface, fits into the rear end surface of the extending portion 51*b*B, which is the recessed curved surface.

In this case, assume that the core body holding component 51B is slightly tilted when a pressure in the direction intersecting the axial direction is applied to the core body 4 attached to the core body holding component 51B. Even in this case, the front end surface of the stem-shaped portion 52*b*B, which is the protruding curved surface, fits into the rear end surface of the extending portion 51*b*B, which is the recessed curved surface. Accordingly, the rear end surface of the extending portion 51*b*B and the front end surface of the stem-shaped portion 52*b*B are not significantly deviated from each other. Therefore, the apex portion of the bottom of the cup-shaped rear end surface of the extending portion 51*b*B can contact the apex portion of the dome-shaped front end surface of the stem-shaped portion 52*b*B. Therefore, in this case as well, the position where the core body holding component 51B contacts the pressing component 52B does not change significantly, preventing the occurrence of the state described with reference to FIG. 6B. Accordingly, the core body holding component 51B can appropriately transmit the pressure applied to the core body 4 in the axial direction to the pressing component 52B and the pressing component 52B can press the pressure detector 6, so that the pressure (writing pressure) applied to the core body 4 can be appropriately detected.

Figure 5B:
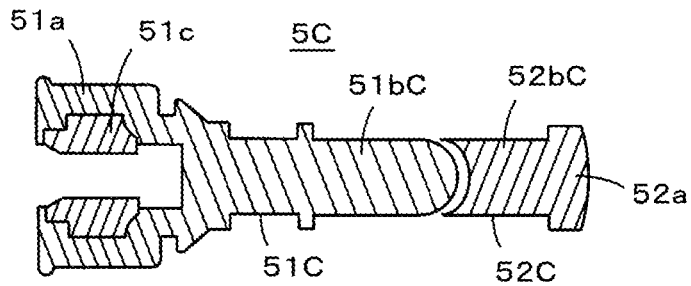

Example in which Protruding Curved Surface is Opposed to Recessed Curved Surface A transmitting component 5C illustrated in FIG. 5B includes a core body holding component 51C and a pressing component 52C. A rear end surface of an extending portion 51bC of the core body holding component 51C is a protruding curved (dome-shaped) surface having the apex at the center, as illustrated in FIG. 5B. A front end surface of a stem-shaped portion 52bC of the pressing component 52C is a recessed curved (cup-shaped) surface having the apex at the center. Accordingly, the rear end surface of the extending portion 51bC of the core body holding component 51C, which is a protruding curved surface having the apex at the center, is opposed to the front end surface of the stem-shaped portion 52bC of the pressing component 52C, which is a recessed curved surface having the apex at the center. Accordingly, the rear end surface of the extending portion 51bC, which is a protruding curved surface, fits into the front end surface of the stem-shaped portion 52bC, which is a recessed curved surface. In this way, the transmitting component 5C is different from the transmitting component 5B illustrated in FIG. 5A in that the shapes of the opposed surfaces of the core body holding component 51C and the pressing component 52C are opposite to the shapes of the opposed surfaces of the core body holding component 51B and the pressing component 52B.

In this case, assume that the core body holding component 51C is slightly tilted when a pressure in the direction intersecting the axial direction is applied to the core body 4 attached to the core body holding component 51C. Even in this case, the rear end surface of the extending portion 51bC, which is a protruding curved surface, fits into the front end surface of the stem-shaped portion 52bC, which is a recessed curved surface. Accordingly, the rear end surface of the extending portion 51bC and the front end surface of the stem-shaped portion 52bC are not significantly displaced from each other. Therefore, the apex portion of the dome-shaped rear end surface of the extending portion 51bC can contact the apex portion of the bottom of the cup-shaped front end surface of the stem-shaped portion 52bC. Therefore, in this case as well, the position where the core body holding component 51C contacts the pressing component 52C does not change significantly, preventing the occurrence of the state described with reference to FIG. 6B. Accordingly, the core body holding component 51C can appropriately transmit the pressure applied to the core body 4 in the axial direction to the pressing component 52C and the pressing component 52C can press the pressure detector 6, so that the pressure (writing pressure) applied to the core body 4 can be appropriately detected.

Figure 5C:
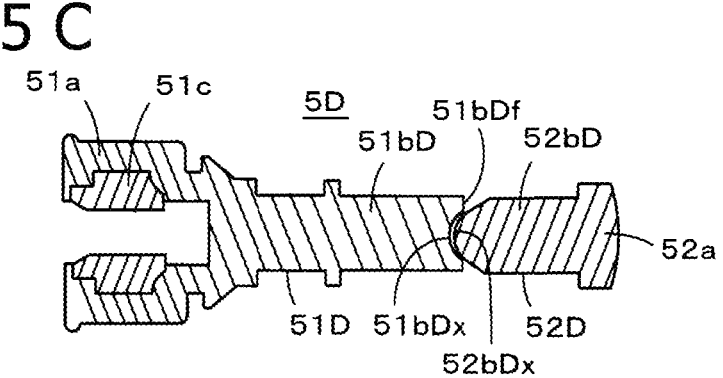

Improved Example in which Recessed Curved Surface is Opposed to Protruding Curved Surface A transmitting component 5D illustrated in FIG. 5C includes a core body holding component 51D and a pressing component 52D. As illustrated in FIG. 5C, a central portion of a rear end surface of an extending portion 51bD of the core body holding component 51D has a recessed curved surface 51bDx and a flat edge portion 51bDf is provided around the recessed curved surface 51bDx. By contrast, a front end surface of the pressing component 52D is a protruding curved surface 52bDx, which corresponds to the recessed curved surface 51bDx of the rear end surface of the core body holding component 51D. Accordingly, the recessed curved surface 51bDx of the rear end surface of the extending portion 51bD of the core body holding component 51D is opposed to the protruding curved surface 52bDx of a stem-shaped portion 52bD of the pressing component 52D. Accordingly, the protruding curved surface 52bDx of the stem-shaped portion 52bD fits into the recessed curved surface 51bDx of the rear end surface of the extending portion 51bD.

In this case, assume that the core body holding component 51D is slightly tilted when a pressure in the direction intersecting the axial direction is applied to the core body 4 attached to the core body holding component 51D. Even in this case, the protruding curved surface 52bDx of the front end surface of the stem-shaped portion 52bD fits into the recessed curved surface 51bDx of the rear end surface of the extending portion 51bD, and there is no obstacle between the rear end surface of the extending portion 51bD and the front end surface of the stem-shaped portion 52bD. Therefore, the contact state can be maintained without difficulty. In addition, the apex portion of the recessed curved surface 51bDx of the rear end surface of the extending portion 51bD can contact the apex portion of the protruding curved surface 52bDx of the front end surface of the stem-shaped portion 52bD. Therefore, in this case as well, the position and surfaces where the core body holding component 51D and the pressing component 52D contact each other do not change significantly, preventing the state described with reference to FIG. 6B. Accordingly, the pressure (writing pressure) applied to the core body 4 in the axial direction can be appropriately transmitted to the pressure detector 6 via the core body holding component 51D and the pressing component 52D, so that the pressure can be appropriately detected.

Figure 5D:
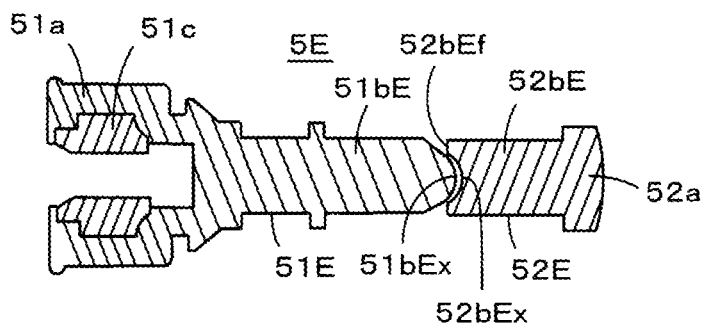

Improved Example in which Protruding Curved Surface is Opposed to Recessed Curved Surface A transmitting component 5E illustrated in FIG. 5D includes a core body holding component 51E and a pressing component 52E. A rear end surface of an extending portion 51bE of the core body holding component 51E is a protruding curved surface 51bEx, as illustrated in FIG. 5D. By contrast, a central portion of a front end surface of the pressing component 52E has a recessed curved surface 52bEx and a flat edge portion 52bEf is provided around the recessed curved surface 52bEx. In other words, the shapes of the rear end surface of the core body holding component 51E and the front end surface of the pressing component 52E are opposite to those illustrated in FIG. 5C. Accordingly, the protruding curved surface 51bEx of the rear end surface of the extending portion 51bE of the core body holding component 51E is opposed to the recessed curved surface 52bEx of a stem-shaped portion 52bE of the pressing component 52E. Accordingly, the protruding curved surface 51bEx of the rear end surface of the extending portion 51bE fits into the recessed curved surface 52bEx of the stem-shaped portion 52bE.

In this case, assume that the core body holding component 51E is slightly tilted when a pressure in the direction intersecting the axial direction is applied to the core body 4 attached to the core body holding component 51E. Even in this case, the protruding curved surface 51bEx of the rear end surface of the extending portion 51bE fits into the recessed curved surface 52bEx of the front end surface of the stem-shaped portion 52bE, and there is no obstacle between the rear end surface of the extending portion 51bE and the front end surface of the stem-shaped portion 52bE. Therefore, the contact state can be maintained without difficulty. In addition, the apex portion of the protruding curved surface 51bEx of the rear end surface of the extending portion 51bE can contact the apex portion of the recessed curved surface 52bEx of the front end surface of the stem-shaped portion 52bE. Therefore, in this case as well, the position and surfaces where the core body holding component 51E and the pressing component 52E contact each other do not change significantly, preventing the state described with reference to FIG. 6B. Accordingly, the pressure (writing pressure) applied to the core body 4 in the axial direction can be appropriately transmitted to the pressure detector 6 via the core body holding component 51E and the pressing component 52E, so that the pressure can be appropriately detected.

In the example illustrated in FIG. 5C, the radius of the protruding curved surface 52bDx of the stem-shaped portion 52bD and how much the protruding curved surface 52bDx protrudes and the radius of the recessed curved surface 51bDx of the extending portion 51bD and how deep the recessed curved surface 51bDx is can be suitably adjusted according to, for example, the size of the electronic pen 1. Similarly, in the case of the example illustrated in FIG. 5D, the radius of the protruding curved surface 51bEx of the extending portion 51bE and how much the protruding curved surface 51bEx protrudes and the radius of the recessed curved surface 52bEx of the stem-shaped portion 52bE and how deep the recessed curved surface 52bEx is can be suitably adjusted according to, for example, the size of the electronic pen 1.

In the case of the examples illustrated in FIGS. 5A to 5D, the rear end surface of the core body holding component and the front end surface of the pressing component are described as recessed or protruding curved surfaces. However, the present disclosure is not limited to these shapes. The bottom portion of the recessed curved surface may be flat or the apex portion of the protruding curved surface may be flat. In short, it suffices that the recessed curved surface and protruding curved surface opposed to each other are configured so as to function like a generally-called universal joint, and even when a pressure in the direction intersecting the axial direction is applied to the core body 4, a pressure applied to the core body 4 in the axial direction can be appropriately transmitted to the pressure detector 6.

Advantageous Effects of Embodiment

In the case of the electronic pen according to the embodiment described above, the transmitting component 5 includes two separate components, that is, the core body holding component 51, to which the core body 4 is attached, and the pressing component 52, which presses the pressure detector 6. Since the pressing component 52 is a component that is separated from the core body holding component 51, the pressing component 52 is not affected by a pressure applied in the direction intersecting the axial direction. Further, the relatively generous space (clearance) is provided around the core body holding component 51 to which the core body 4 is attached. With this configuration, the core body holding component 51 can be slid, that is, pushed in or pushed back in the axial direction without receiving a stress, in response to a pressure (writing pressure) applied to or released from the core body 4.

As illustrated in FIGS. 4B to 4D and 5A to 5D, the shapes of the opposed surfaces of the core body holding components 51, 51A, 51B, 51C, 51D, and 51E and the pressing components 52, 52A, 52B, 52C, 52D, and 52E can be changed. Accordingly, the effect of a pressure applied to the core body 4 in the direction intersecting the axial direction can be eliminated as much as possible and a pressure applied to the core body 4 in the axial direction can be appropriately transmitted to the pressure detector 6. Accordingly, the pressure applied to the core body 4 in the axial direction can be detected more appropriately.

Modifications

Although the examples in which the present disclosure is applied to the electronic pen 1 of the active capacitive system have been described in the embodiment described above, the present disclosure is not limited thereto. For example, the present disclosure can be applied to electronic pens of various systems, such as an electronic pen of an electromagnetic induction system, in which a pressure applied to a core body can be detected by a pressure detector.

Further, in the case where the rear end surface of the extending portion of the core body holding component is a protruding or recessed curved surface, the radius of the curved surface, how much the curved surface protrudes, or how deep the curved surface is can be suitably adjusted. Similarly, in the case where the front end surface of the stem-shaped portion of the pressing component is a protruding or recessed curved surface, the radius of the curved surface and how much the curved surface protrudes or how deep the curved surface is can be suitably adjusted.

It is to be noted that the embodiment of the present invention is not limited to the foregoing embodiment, and that various changes can be made without departing from the spirit of the present invention.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An electronic pen comprising:
 a core body;
 a pressure detector which, in operation, detects a pressure applied to the core body; and
 a transmitting component which is located between the core body and the pressure detector and which, in operation, transmits the pressure applied to the core body to the pressure detector,
 wherein the transmitting component includes two separate components including a core body holding component which holds the core body and a pressing component which, in operation, presses the pressure detector,
 wherein a rear end surface of the core body holding component and a front end surface of the pressing component are opposed to each other, and wherein one of:

the rear end surface of the core body holding component is a flat surface, and the front end surface of the pressing component is a protruding curved surface, or the rear end surface of the core body holding component is the protruding curved surface, and the front end surface of the pressing component is the flat surface, or the rear end surface of the core body holding component is the protruding curved surface, and the front end surface of the pressing component is the protruding curved surface, or the rear end surface of the core body holding component is a recessed curved surface, and the front end surface of the pressing component is the protruding curved surface, or the rear end surface of the core body holding component is the protruding curved surface, and the front end surface of the pressing component is the recessed curved surface.

2. The electronic pen according to claim 1, further comprising:

a coil spring which is conductive and configured to extend and contract; and an electronic circuit which includes a transmitting circuit and which, in operation, forms a signal obtained by including a detection result from the pressure detector in a signal from the transmitting circuit and outputs the signal, wherein the core body holding component penetrates through a central axis of the coil spring and is not biased by the coil spring, and wherein a first end of the coil spring on a pen tip side is connected to the core body holding component having conductivity and held by the coil spring, and a second end of the coil spring is connected to the electronic circuit.

3. The electronic pen according to claim 1, further comprising:

a coil spring which is conductive and configured to extend and contract;

an electronic circuit which includes a transmitting circuit and which, in operation, forms a signal obtained by including a detection result from the pressure detector in a signal from the transmitting circuit and outputs the signal; and a pipe-shaped holding component, wherein the core body holding component penetrates through a central axis of the coil spring and is not biased by the coil spring, wherein a first end of the coil spring on a pen tip side is connected to the core body holding component having conductivity and held by the coil spring, and a second end of the coil spring is connected to the electronic circuit, and wherein the pipe-shaped holding component covers a rear end of the core body holding component, a rear end of the coil spring, and a front end of the pressing component, and a space between a side surface of the pressing component and an inner wall surface of the pipe-shaped holding component is narrower than a space between side surfaces of the core body holding component and the coil spring and the inner wall surface of the pipe-shaped holding component.

4. The electronic pen according to claim 1, further comprising:

a pipe-shaped holding component; and a coil spring for the pressure detector, wherein the pipe-shaped holding component covers a rear end of the core body holding component and a front end of the pressing component, and a space between a side surface of the pressing component and an inner wall surface of the pipe-shaped holding component is narrower than a space between a side surface of the core body holding component and the inner wall surface of the pipe-shaped holding component, and wherein the coil spring for the pressure detector is disposed between the pipe-shaped holding component and a first electrode of the pressure detector configured as a variable capacitor.

5. An electronic pen comprising:

a core body;

a pressure detector which, in operation, detects a pressure applied to the core body; and a transmitting component which is located between the core body and the pressure detector and which, in operation, transmits the pressure applied to the core body to the pressure detector, wherein the transmitting component includes two separate components including a core body holding component which holds the core body and a pressing component which, in operation, presses the pressure detector, wherein a rear end surface of the core body holding component and a front end surface of the pressing component are opposed to each other, and wherein a central portion of the rear end surface of the core body holding component has a recessed curved surface, and a flat edge portion is provided around the recessed curved surface, and the front end surface of the pressing component is a protruding curved surface which corresponds to the recessed curved surface of the core body holding component.

6. An electronic pen comprising:

a core body;

a pressure detector which, in operation, detects a pressure applied to the core body; and a transmitting component which is located between the core body and the pressure detector and which, in operation, transmits the pressure applied to the core body to the pressure detector, wherein the transmitting component includes two separate components including a core body holding component which holds the core body and a pressing component which, in operation, presses the pressure detector, wherein a rear end surface of the core body holding component and a front end surface of the pressing component are opposed to each other, and wherein a central portion of the front end surface of the pressing component has a recessed curved surface, and a flat edge portion is provided around the recessed curved surface, and the rear end surface of the core body holding component is a protruding curved surface which corresponds to the recessed curved surface of the pressing component.

* * * * *